United States Patent Office 3,448,019
Patented June 3, 1969

3,448,019
PROCESS FOR MAKING CARBAMATES
Vernon D. Parker, Midland, Mich., assignor to The Dow Chemical Company, Midland, Mich., a corporation of Delaware
No Drawing. Filed Aug. 1, 1966, Ser. No. 569,076
Int. Cl. C07c *103/02;* B01k *1/00*
U.S. Cl. 204—59    8 Claims This invention relates to processes for making alkyl or alkenyl esters of organocarbamic acids. In particular, it relates to the preparation of esters having the formula:

RNCOOR' wherein R is an alkyl, alkenyl or aryl radical which may bear one or more inert substituents, such as alykyl, alkoxy, phenoxy, or —NCOOR' radicals and R' is a lower alkyl or alkenyl radical.

According to the invention, carbamates of the type illustrated above are made by the electro-oxidation of the compound R—H in the presence of isocyanate ion (NCO⁻) and the alcohol R'OH.

The reactant R—H may be any of a wide variety of organic compounds having at least one hydrogen atom directly attached to carbon and such that it is the most readily electro-oxidizable site on the molecule. These include alkenes, cycloalkenes, aromatic hydrocarbons, aryl ethers, and the like. Specific examples of such compounds are ethylene, hexene, cyclohexene, benzene, toluene, xylene, naphthalene, anisole, diphenyl ether, and the like. Where the compound has two or more such replaceable hydrogen atoms, more than one carbamate group may thus be attached at such sites by the process of the invention, as will be illustrated hereinafter.

The reactant alcohol, R'OH is a lower alkanol or alkenol, suitable specific compounds being methanol, ethanol, isopropanol, allyl alcohol, and the like.

The isocyanate ion may be supplied in any convenient manner. Preferably it is furnished by a soluble cyanate salt, such as an alkali metal cyanate. The potassium salt is generally convenient, though it may be desirable to use others, such as the sodium, cesium, silver, mercury, or other salt in systems where they are more soluble or have other advantages.

In the preferred mode of operation, the reaction is conducted in a large excess of the alcohol reactant, this then serving as a solvent and reaction medium. Alternatively, an inert solvent or diluent may be used, though there is ordinarily no advantage in doing so. Suitable such solvents include aliphatic nitriles, such as acetonitrile and non-aromatic ethers, particularly cyclic ethers, such as dioxane.

Since most cyanates are at best only sparingly soluble in organic solvents, it is usually necessary to use a relatively large volume of organic liquid to dissolve the cyanate. This liquid may be made up of the other two reactants in more or less stoichiometric proportions, or with a substantial excess of either one, or it may be constituted largely of an inert solvent as decribed above. In general, it is preferred to use a large excess of the alcohol reactant, this excess then serving as solvent for the cyanate and as the reaction medium.

The practice of the invention is illustrated by the following examples.

GENERAL PROCEDURE

The reactor was a 250-ml. 3-neck flask with a carbon anode and cathode of about one square inch surface area each, gas inlet and outlet tubes and a magnetic stirrer.

The reactor was charged wwith 200 ml. of methanol, 10 g. of the oxidizable reactant R—H and 2.5 g. of potassium cyanate, and then flushed with nitrogen. The voltage was adjusted to provide a current of 0.1–1.0 amp. The anode potential was 1.8–5.0 volts as compared to a standard calomel electrode. After 16 hours the circuit was opened, the excess reactants were distilled under reduced pressure, the residue was taken up in chloroform, the salt was filtered out, the product analyzed by vapor phase chromatography and identified by infrared and mass spectroscopy.

The table below shows the reactants, R—H, that were used and the carbamate produced.

CARBAMATES, RNCOOCH$_3$

| Example | R—H | Product |
|---|---|---|
| 1 | Benzene | Methyl phenylcarbamate. |
| 2 | Toluene | Methyl o- and p-tolycarbamates. |
| 3 | Naphthalene | Methyl α-naphthylcarbamate. |
| 4 | Anisole | Methyl o- and p-methoxyphenyl-carbamates. |
| 5 | Cyclohexene | Methyl 2-cyclohexenylcarbamate. |
| 6 | Diphenyl ether | Methyl o- and p-phenoxyphenyl-carbamates. |
| 7 | Methyl phenyl-carbamate. | Dimethyl o- and p-benzenedicarbamates. |

When the potassium cyanate used in Example 5 was replaced with an equivalent amount of silver cyanate, the product was the same.

I claim:

1. The process for making a carbamate of the formula RNCOOR', wherein R is an alkenyl, cycloalkenyl or aryl radical and R' is a lower alkyl or alkenyl radical, comprising passing a direct electric current through a conductive mixture comprising a compound of the formula R—H, an alcohol of the formula R'OH and a compound providing NCO⁻ ions.

2. The process of claim 1 wherein R—H is aromatic.

3. The process of claim 2 wherein R—H is a hydrocarbon.

4. The process of claim 3 wherein R—H is a member of the benzene series.

5. The process of claim 4 wherein R—H is toluene.

6. The process of claim 5 wherein R'OH is methanol.

7. The process of claim 1 wherein R'OH is a lower alkanol.

8. The process of claim 7 wherein R'OH is methanol.

References Cited

UNITED STATES PATENTS 3,361,653    1/1968    Miller _____ 204—59

HOWARD S. WILLIAMS, *Primary Examiner.*